(12) United States Patent
Ford

(10) Patent No.: US 6,616,181 B1
(45) Date of Patent: Sep. 9, 2003

(54) HORN MECHANISM FEATURING IMMUNITY TO CUSHION FOLD

(75) Inventor: Brian Ford, Mt. Clemens, MI (US)

(73) Assignee: Breed Automotive Tedhnology, Inc., Lakeland, FL (US)

(*) Notice: Subject to any disclaimer, the term of this patent is extended or adjusted under 35 U.S.C. 154(b) by 0 days.

(21) Appl. No.: 10/254,587

(22) Filed: Sep. 26, 2002

Related U.S. Application Data

(60) Provisional application No. 60/370,430, filed on Apr. 5, 2002.

(51) Int. Cl.[7] ............................................. B60R 21/16
(52) U.S. Cl. ................................... 280/731; 200/61.54
(58) Field of Search ...................... 280/731; 200/61.54, 200/61.55

(56) References Cited

U.S. PATENT DOCUMENTS

| | | | |
|---|---|---|---|
| 4,594,486 A | | 6/1986 | Noda ........................ 200/61.54 |
| 5,036,169 A | | 7/1991 | Sakane ..................... 200/61.54 |
| 5,085,462 A | * | 2/1992 | Gualtier ...................... 280/731 |
| 5,265,905 A | * | 11/1993 | Shelton ....................... 280/731 |
| 5,308,106 A | * | 5/1994 | Heidorn ................... 280/728.3 |
| 5,369,232 A | | 11/1994 | Leonelli ................... 200/61.54 |
| 5,371,333 A | * | 12/1994 | Kanai et al. ............. 200/61.54 |
| 5,413,376 A | * | 5/1995 | Filion et al. ............. 280/728.5 |
| 5,523,532 A | | 6/1996 | Leonelli et al. .......... 200/61.54 |
| 5,575,498 A | | 11/1996 | Elqadah et al. ............. 280/731 |
| 5,577,766 A | * | 11/1996 | Niwa et al. .................. 280/731 |
| 5,626,358 A | | 5/1997 | Ricks et al. ................. 280/731 |
| 5,630,617 A | * | 5/1997 | Hashiba ....................... 280/731 |
| 5,692,770 A | | 12/1997 | Scharboneau et al. ... 280/728.2 |
| 5,700,029 A | | 12/1997 | Enders ..................... 280/728.2 |
| 5,720,493 A | * | 2/1998 | Sugiyama et al. .......... 280/731 |
| 5,727,811 A | * | 3/1998 | Nagata et al. .............. 280/731 |
| 5,738,369 A | | 4/1998 | Durrani ....................... 280/731 |
| 5,739,492 A | * | 4/1998 | Ricks et al. ............. 200/61.54 |
| 5,762,365 A | * | 6/1998 | Worrell et al. .............. 280/731 |
| 5,767,466 A | | 6/1998 | Durrani ................... 200/64.54 |
| 5,775,728 A | | 7/1998 | Niwa et al. .............. 280/728.3 |
| 5,797,622 A | | 8/1998 | Turner et al. ............... 280/731 |
| 5,855,392 A | * | 1/1999 | Simpson et al. ............ 280/731 |
| 5,873,596 A | | 2/1999 | Kantoh et al. ........... 280/728.2 |
| 5,904,366 A | * | 5/1999 | Nishijima et al. ....... 280/728.2 |
| 5,924,831 A | | 7/1999 | Ricks et al. ................. 411/508 |
| 5,947,509 A | | 9/1999 | Ricks et al. ............. 280/728.2 |
| 6,042,142 A | | 3/2000 | Ricks ......................... 280/731 |
| 6,050,597 A | | 4/2000 | Coleman ..................... 280/731 |
| 6,139,051 A | * | 10/2000 | Fujita .......................... 280/731 |
| 6,435,546 B1 | * | 8/2002 | Scherer et al. .............. 280/731 |
| 6,457,379 B1 | * | 10/2002 | Mirone ........................ 74/552 |

FOREIGN PATENT DOCUMENTS

JP          6-239241          8/1994

* cited by examiner

Primary Examiner—Paul N. Dickson
Assistant Examiner—Laura B. Rosenberg
(74) Attorney, Agent, or Firm—Jarett Rieger

(57) ABSTRACT

An airbag module has an airbag and a cover having a tear seam for the airbag. A backing plate is mounted to the cover and positioned between airbag and cover. Disposed between packing plate and cover is a horn switch. The horn switch is nested in a depression of the backing plate.

7 Claims, 5 Drawing Sheets

HORN MECHANISM FEATURING IMMUNITY TO CUSHION FOLD

This application claims priority to U.S. Provisional Patent Application Ser. No. 60/370,430 filed on Apr. 5, 2002.

FIELD OF THE INVENTION

The present invention relates to an airbag module for a motor vehicle.

BACKGROUND OF THE INVENTION

A driver side airbag module is typically mounted in a motor vehicle's steering wheel. The module is attached to the hub of the steering wheel and may comprise an airbag, a steering wheel cover, and an inflator. Each of these elements is supported on the steering wheel as known.

To accommodate the location of the airbag, horn switches are frequently placed on the spokes of the steering wheel. A drawback to this particular design is the movement of the horn switch with the rotation of the steering wheel. One design has overcome this problem by incorporating a horn mechanism into the airbag module. This type of horn, called a "floating horn," is formed by floating the airbag module on a spring assembly within the steering wheel assembly. A horn switch is placed between the airbag module and the base of the steering wheel. To actuate the horn, the entire module is moved toward the steering wheel hub, thereby activating the horn switch and actuating the horn. This horn switch design is expensive and requires a significant gap between the module and the steering wheel so that the module may float.

Another type of horn switch design mounts a thin, flexible membrane switch on the back or inner surface of the steering wheel cover. The membrane switch is spaced between the cover and the folded airbag. Membrane switches conventionally comprise two very thin non-conductive sheets having a conducting coating separated by thin spacers. Pressure on the switch moves the conductive surfaces together to close an electric circuit and actuate the horn.

Membrane switches are expensive and their installation is labor intensive. Moreover, these switches are susceptible to inadvertent actuation, which cause the horn to sound at undesirable times. In particular, when the airbag is not properly folded, pressure is brought to bear on the membrane by the poor folds, thereby resulting in advertent horn actuation. In other instances, extreme hot or cold temperatures can cause the cover to expand or contract, causing the horn to actuate.

A need therefore exists for an airbag module assembly incorporating a horn switch mechanism that avoids the foregoing drawbacks.

SUMMARY OF THE INVENTION

The invention comprises an airbag module. The airbag module has an airbag and a cover having a tear seam for the airbag. A backing plate is mounted between the airbag and the cover. Supported between the backing plate and the cover is a horn switch, which sits within a pocket that helps protect the horn switch from inadvertent actuation caused by an airbag fold.

A contact plate between the horn switch and the cover may be employed. The contact plate may be larger than the horn switch to thereby create a larger contact surface area for actuation of the horn switch. The contact plate may have a finger that extends into the pocket of the backing plate to assist in actuation of the horn switch. The contact plate may further be mounted to the backing plate.

The horn switch may comprise two electric contacts, one of which may be mounted to the backing plate. A spring may bias one electric contact away from the other and may also serve to bias the contact plate away from the backing plate. One of the electrical contacts may serve as the spring.

The cover may have two sides, one of which has protrusions in contact with the contact plate to improve horn actuation. The cover may further comprise two portions, divided by the tear seam, with the backing plate mounted to one of the tear portions. In this way, the backing plate will not be ejected during airbag deployment.

The invention may thus employ an inexpensive mechanical horn switch as part of the airbag module. Inadvertent horn actuation is greatly reduced by seating the horn switch around the protective pocket within the backing plate, which further protects the horn switch from the folds of the airbag. In this way, the invention avoids the expense of the membrane switch and insulates the switch from the folds of the airbag. In addition, the airbag module takes up less space than the "floating horn" design.

BRIEF DESCRIPTION OF THE DRAWINGS

The various features and advantages of this invention will become apparent to those skilled in the art from the following detailed description of the currently preferred embodiment along with the accompanying drawings.

DETAILED DESCRIPTION OF THE INVENTION

Figure 1A:
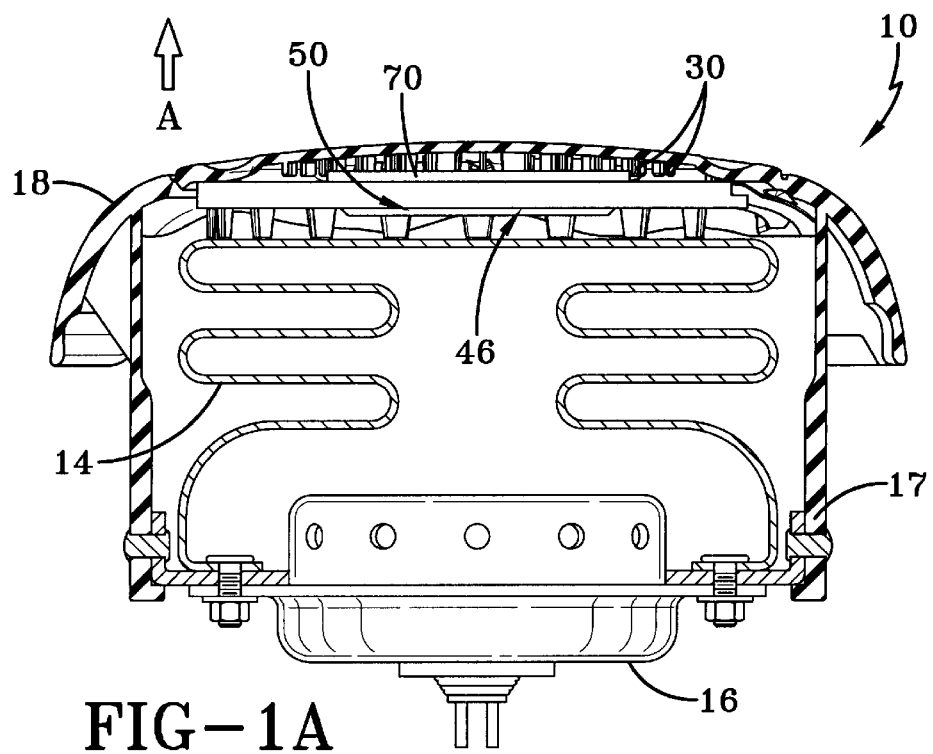
FIG. 1A illustrates a side profile of the inventive airbag module, showing airbag, inflator, and horn actuation switch.
Figure 2:
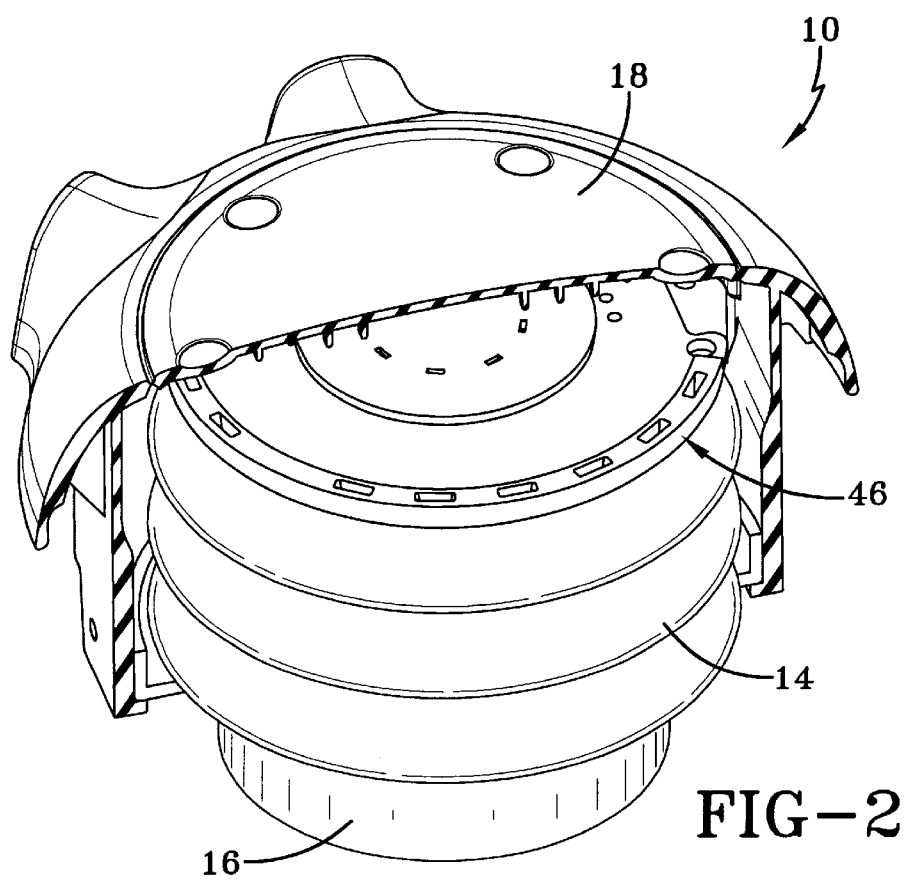
FIG. 2 illustrates a perspective view of the inventive airbag module shown in FIGS. 1A and 1B.
Figure 1B:
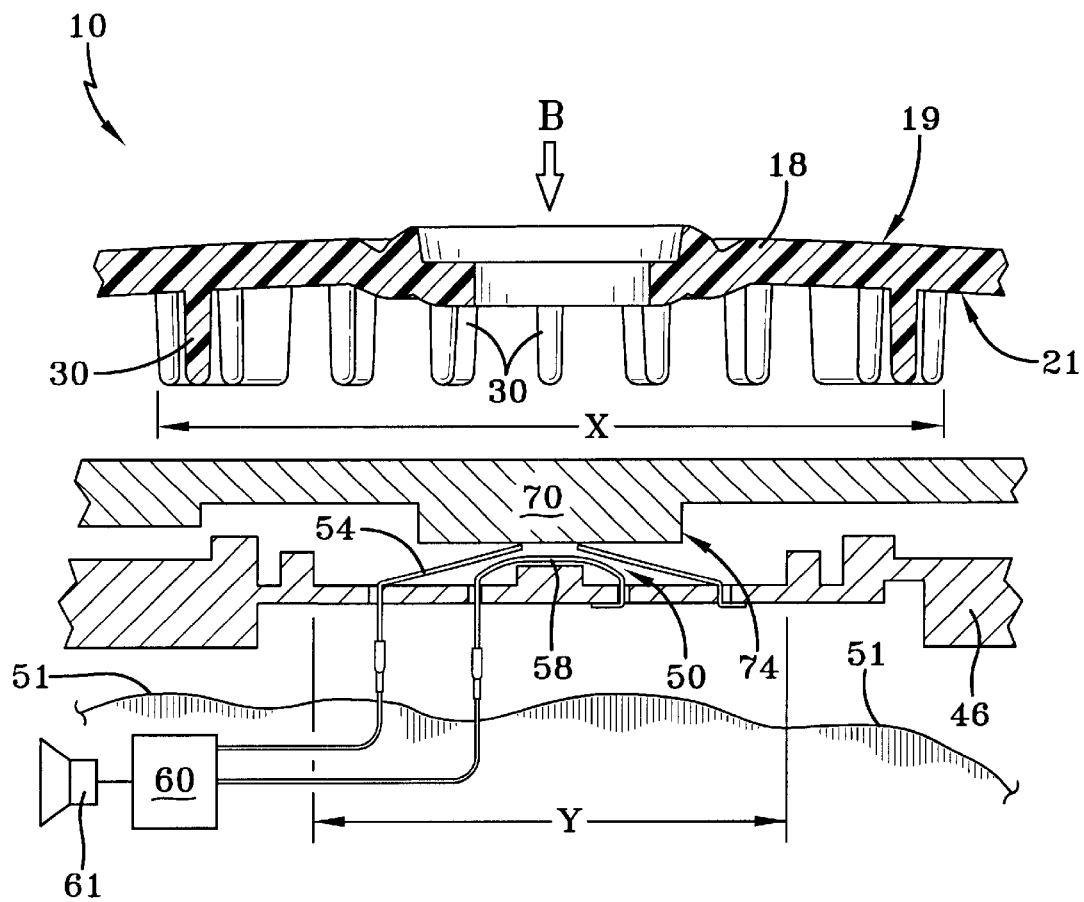
FIG. 1B illustrates a close up of the view offered by FIG. 1A, highlighting horn switch and pocket on a backing plate.

As shown in FIGS. 1A and 1B, the inventive airbag module 10 comprises an airbag 14 disposed on an inflator 16 within a housing 17. The cover 18 has a tear away seam to permit the airbag 14 to move in the direction indicated by an arrow A once the inflator 16 is activated. These features are well known.

In contrast to known assemblies, the airbag module 10 has a backing plate 46 mounted to a cover 18. As seen in FIG. 1B, the backing plate 46 is spaced from the cover 18 to permit the placement of the horn switch 50 between the cover 18 and the backing plate 46. The horn switch 50 may comprise a first electric contact 54 and a second electric contact 58. The first electric contact 54 is spaced from the second electric contact 58. Actuation of the horn switch 50 along the arrow B causes the first electric contact 54 to contact the second electric contract 58, thereby completing the horn circuit 60 (shown schematically) and causing the horn 61 to sound.

Figure 3:
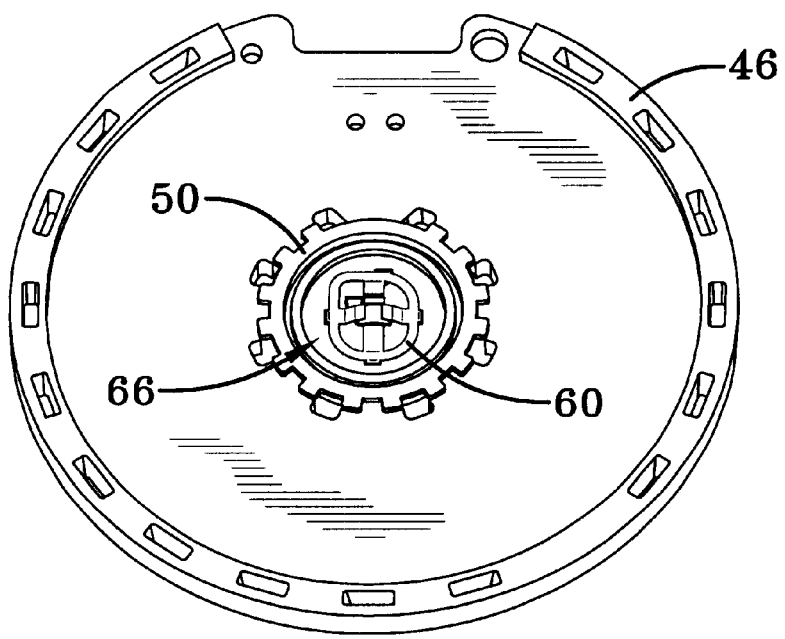
FIG. 3 illustrates backing plate with horn switch seated in a pocket of the backing plate.

As shown in FIG. 3 and FIG. 1B, the horn switch 50 is mounted in a pocket 66 at the backing plate 46. The pocket 66 may be a cavity, depression or other deformation in the backing plate 46 sized to receive the horn switch 50. Because the horn switch 50 is disposed in the pocket 66 of the backing plate 46, the horn switch 50 is less susceptible to inadvertent horn actuation. The backing plate 46 is rigid and insulates the horn switch 50 from the folds 51 of the airbag 14. In addition, placing the horn switch 50, at least partially within the protective confines of the pocket 66, further isolates the horn switch 50 against inadvertent actuation. Moreover, because the horn switch 50 comprises electric contacts rather than conductive layers, the horn switch 50 provides greater resistance to actuation then a membrane switch. Notably, the first electric contact 54 is shaped in the form of an arc as shown in FIG. 1B. This shape allows the first electric contact 54 to act as a spring against the actuation of the horn switch 50 along the arrow B. The amount of resistance to actuation may be adjusted by known techniques.

The horn switch 50 has a predetermined size, say length Y, as shown in FIG. 1B. To increase the area of horn actuation, a contact plate 70 is disposed between the horn switch 50 and the cover 18. The contact plate has a larger dimension, say length X, than the horn switch 50, thereby increasing the area for the horn switch 50 actuation from the driver's position. Further, the cover 18, has a first side 19 and a second side 21. The second side 21 has protrusions 30, which when the first side 19 is depressed along arrow B, come into contact with the contact plate 70, causing the first electric contact 54 to contact the second electrical contact 58. As shown in FIG. 1B, the first electric contact 54, acting as a spring, keeps the contact plate 70 biased away from the backing plate 46.

Figure 4:
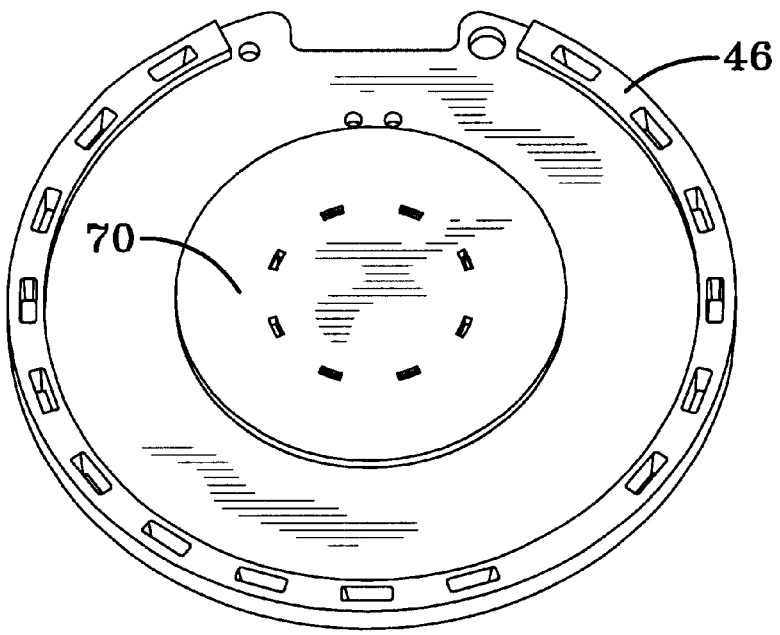
FIG. 4 illustrates contact plate mounted above horn switch and onto backing plate.
Figure 6:
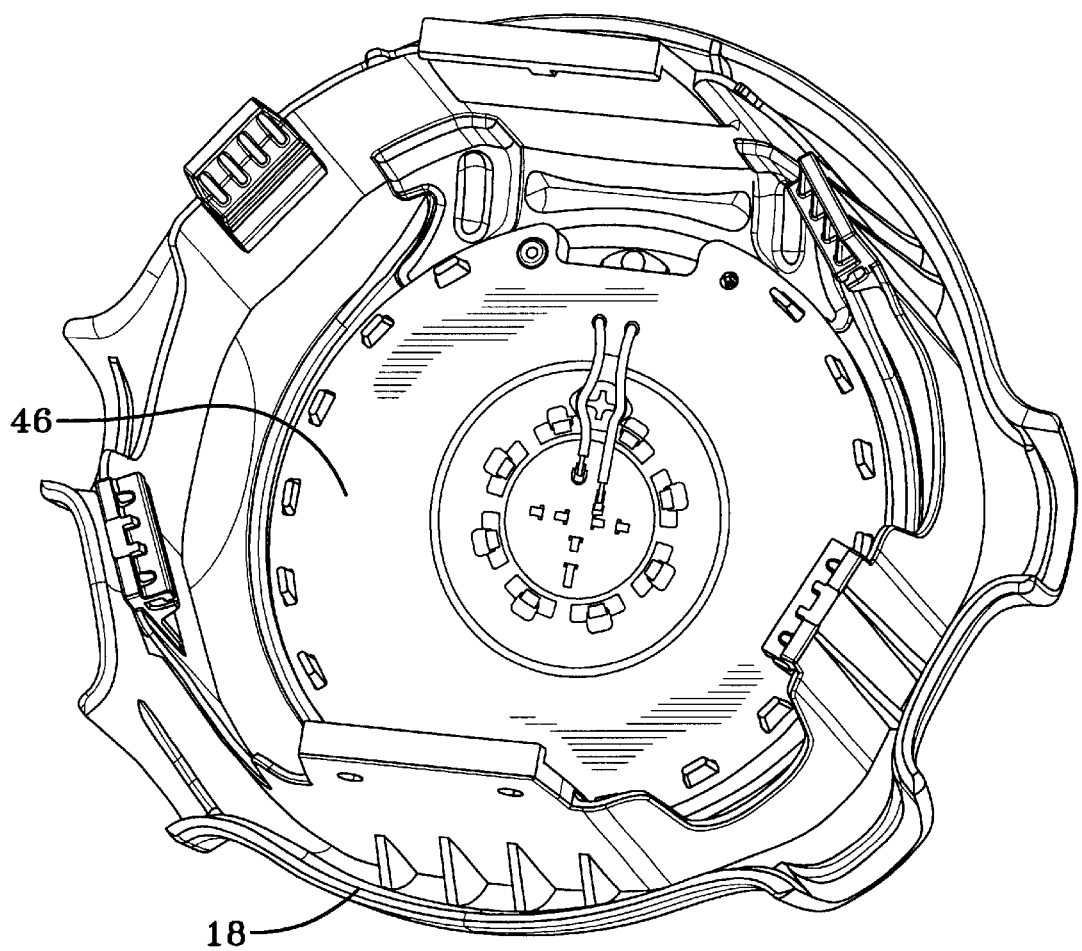
FIG. 6 illustrates a reverse side of the view offered by FIG. 5, showing backing plate mounted to cover.

As shown in FIG. 4, the contact plate 70 is mounted to the backing plate 46. The contact plate may be snap fitted to the backing plate 46 with the horn switch 50 disposed between the two plates. As shown in FIG. 6, the backing plate 46 may then be mounted to the cover 18 by, for example, heat staking of the backing plate 46 to the cover 18.

Figure 5:
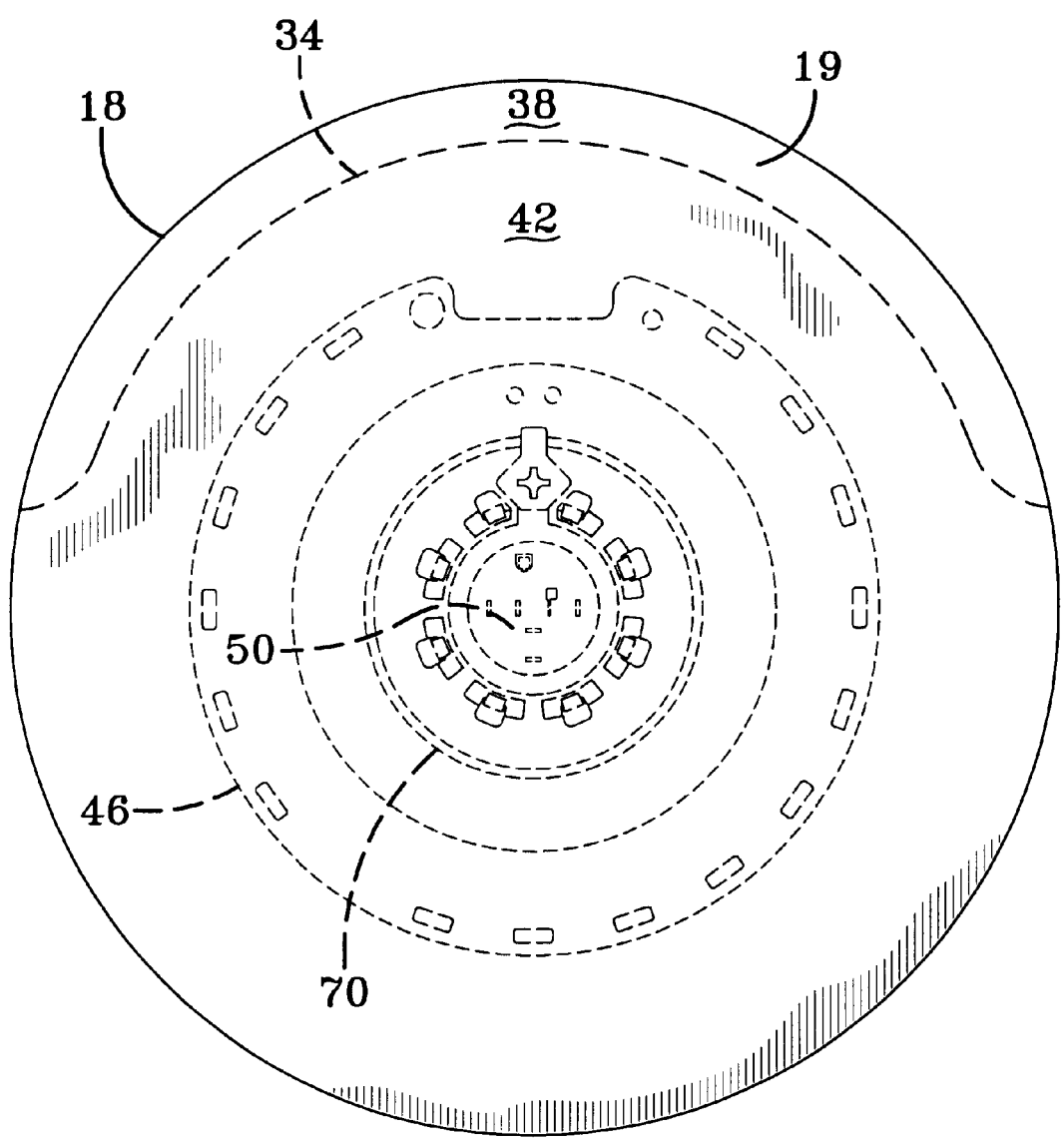
FIG. 5 illustrates a perspective view of cover.

FIG. 5 illustrates a first side 19 of the cover 18. The cover 18 has a tear seam 34 placed on the cover as known. During deployment of the airbag 14, the cover 18 tears along the tear seam 34 into two portions: a first portion 38 and a second portion 42. A backing plate 46 may be attached to the second portion 42 so that the backing plate 46 horn switch 50 and contact plate 70 remain attached to the second portion 42 when the airbag 14 is inflated and the tear seam 34 is torn.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An airbag module comprising:

an airbag;

a cover having a tear seam for the airbag;

a backing plate between the airbag and the cover, the backing plate mounted to the cover;

a horn switch between the backing plate and the cover, wherein the horn switch comprises a first electric contact and a second electric contact, at least one of the electric contacts mounted to the backing plate, wherein at least one of the electric contacts comprises a spring, the spring biases the first electric contact away from the second electric contact; and a depression in the backing plate at least partially receiving the horn switch.

2. The airbag module of claim 1 including a contact plate between the horn switch and the cover.

3. The airbag module of claim 2 wherein the horn switch has an actuation area of a predetermined size, the contact plate having an area larger than the predetermined size.

4. The airbag module of claim 3 wherein the contact plate has an extension in communication with the horn switch.

5. The airbag module of claim 1 wherein the tear seam defines a first tear portion area and a second tear portion, the backing plate mounted to one of the tear portions.

6. The airbag module of claim 1 wherein the cover comprises a first surface and a second surface, the second surface having protrusions in communication with the horn switch.

7. The airbag module of claim 1 including a contact plate mounted between the backing plate and the cover.

* * * * *